United States Patent
Han et al.

(10) Patent No.: US 12,322,773 B2
(45) Date of Patent: Jun. 3, 2025

(54) SECONDARY BATTERY

(71) Applicant: Samsung SDI Co., Ltd., Yongin-si (KR)

(72) Inventors: Won Chull Han, Yongin-si (KR); Jeong Chull Ahn, Yongin-si (KR); Shin Gun Kang, Yongin-si (KR); Sang Hyun Kim, Yongin-si (KR); Sung Soo Park, Yongin-si (KR); Soo Youn Park, Yongin-si (KR); Chang Wook Kim, Yongin-si (KR); Young Jin Park, Yongin-si (KR); Yu Jin Han, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 281 days.

(21) Appl. No.: 16/756,443

(22) PCT Filed: Sep. 20, 2018

(86) PCT No.: PCT/KR2018/011123
§ 371 (c)(1),
(2) Date: Apr. 15, 2020

(87) PCT Pub. No.: WO2019/098520
PCT Pub. Date: May 23, 2019

(65) Prior Publication Data
US 2020/0259222 A1  Aug. 13, 2020

(30) Foreign Application Priority Data
Nov. 14, 2017  (KR) .................. 10-2017-0151752

(51) Int. Cl.
*B32B 15/20* (2006.01)
*H01M 10/613* (2014.01)
(Continued)

(52) U.S. Cl.
CPC .......... *H01M 10/613* (2015.04); *B32B 15/20* (2013.01); *H01M 50/119* (2021.01);
(Continued)

(58) Field of Classification Search
None
See application file for complete search history.

(56) References Cited

U.S. PATENT DOCUMENTS 9,722,217 B2   8/2017  Lee et al.
2005/0132562 A1*  6/2005  Saito ................ H01M 4/043
                                                29/623.5
(Continued)

FOREIGN PATENT DOCUMENTS

CN    1314008 A  *  9/2001  .......... H01M 2/0267
JP    2001-256960 A    9/2001
(Continued)

OTHER PUBLICATIONS

Translation—CN-1314008-A; Arao E; Sep. 2001 (Year: 2001).*
(Continued)

*Primary Examiner* — Humera N. Sheikh
*Assistant Examiner* — Elizabeth D Ivey
(74) *Attorney, Agent, or Firm* — Womble Bond Dickinson (US) LLP

(57) ABSTRACT

The present invention relates to a secondary battery which includes a sheathing made of a material having an increased thermal conductivity and can thus have an improved safety. As an example, disclosed is a secondary battery comprising: an electrode assembly; and a sheath material which receives the electrode assembly and comprises a metal layer and a non-metal layer formed on the surface of the metal layer, wherein the thickness of the metal layer occupies 50% to 70% of the total thickness of the sheath material.

4 Claims, 2 Drawing Sheets

(51) Int. Cl.
*H01M 50/119* (2021.01)
*H01M 50/121* (2021.01)
*H01M 50/126* (2021.01)
*H01M 50/131* (2021.01)
*H01M 50/133* (2021.01)

(52) U.S. Cl.
CPC ....... *H01M 50/121* (2021.01); *H01M 50/126* (2021.01); *H01M 50/131* (2021.01); *H01M 50/133* (2021.01)

(56) References Cited

U.S. PATENT DOCUMENTS

2012/0276443 A1* 11/2012 Hatta .................. B32B 7/12
  429/185
2012/0288746 A1* 11/2012 Abe .................. H01M 10/0413
  29/623.2
2015/0044547 A1* 2/2015 Lee .................. C22C 38/00
  429/186

FOREIGN PATENT DOCUMENTS

| | | | | |
|---|---|---|---|---|
| JP | 3724955 | B2 | * 12/2005 | .......... H01M 2/0257 |
| JP | 2007-95423 | A | 4/2007 | |
| KR | 10-1023145 | B | 3/2011 | |
| KR | 10-2013-0089614 | A | 8/2013 | |
| KR | 10-2013-0126107 | A | 11/2013 | |
| KR | 10-1442854 | B | 9/2014 | |
| KR | 10-2015-0017529 | A | 2/2015 | |
| KR | 10-2016-0032719 | A | 3/2016 | |
| KR | 10-2016-0090562 | A | 8/2016 | |

OTHER PUBLICATIONS

Translation JP 3724955 B2—Isao et al Dec. 7, 2005 (Year: 2005).*
Korean Notice of Allowance dated Jul. 30, 2020, for corresponding Korean Patent Application No. 10-2017-0151752 (6 pages).

* cited by examiner

SECONDARY BATTERY

CROSS-REFERENCE TO RELATED APPLICATION(S)

This application is a National Phase Patent Application of International Patent Application Number PCT/KR2018/011123, filed on Sep. 20, 2018, which claims priority of Korean Patent Application No. 10-2017-0151752, filed Nov. 14, 2017. The entire contents of both of which are incorporated herein by reference.

TECHNICAL FIELD

The present disclosure relates to a secondary battery.

BACKGROUND ART

Unlike primary batteries, which cannot be recharged, secondary batteries are chargeable and dischargeable and are widely used not only in small high-tech electronic devices including mobile phones, personal digital assistants (PDAs), notebook computers, or the like, but also in energy storage systems.

Because such secondary batteries are used for an extended period of time by charge and discharge operations, it is a matter of great interest to secure the safety thereof. If the heat generated during charging/discharging of a secondary battery, i.e., the temperature of a secondary battery, is not properly controlled, the secondary battery may be unavoidably deteriorated, making it difficult to ensure a battery life. As such, properly controlling the temperature of a secondary battery has become one of major technical challenges.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

Provided is a secondary battery which includes a sheathing made of a material having an increased thermal conductivity and can thus have an improved safety.

Solution to Problem

According to the present disclosure, disclosed is a secondary battery comprising: an electrode assembly; and a sheath material which receives the electrode assembly and comprises a metal layer and a non-metal layer formed on the surface of the metal layer, wherein the thickness of the metal layer occupies 50% to 70% of the total thickness of the sheath material.

The thickness of the metal layer may be 1.04 to 1.86 times that of the non-metal layer.

The non-metal layer may include a first insulation layer located on one surface of the metal layer and defining the internal surface of the sheath material; a second insulation layer located on the other surface of the metal layer and defining the external surface of the sheath material; and an adhesion member located between the first insulation layer and the metal layer and between the second insulation layer and the metal layer.

The thickness of the first insulation layer may occupy 20% to 30% of the total thickness of the sheath material.

The thickness of the second insulation layer may occupy 13% to 20% of the total thickness of the sheath material.

The thermal conductivity of the sheath material may range from 120 to 150 W/mk.

The thickness of the secondary battery may range from 2.5 mm to 6 mm.

The thickness of the sheath material may range from 80 μm to 120 μm.

The first insulation layer may include casted polypropylene (CPP), and the second insulation layer comprises nylon, polyethylene terephthalate (PET), polybutylene terephthalate (PBT), or polybutylene naphthalate (PBN).

The metal layer may include aluminum, an aluminum alloy, iron, or an iron alloy.

Advantageous Effects of Disclosure

As described above, the secondary battery according to an embodiment of the present disclosure can increase the thickness of a metal layer while reducing the thickness(es) of a first insulation layer and/or a second insulation layer, thereby improving the safety of the secondary battery by increasing a thermal conductivity without increasing the total thickness of a sheath material.

BEST MODE FOR CARRYING OUT DISCLOSURE

Hereinafter, example embodiments of the present disclosure will be described in detail.

Various embodiments of the present disclosure are provided for a more complete understanding of the disclosure and may be embodied in many different forms and should not be construed as being limited to the following example embodiments. Rather, these example embodiments of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
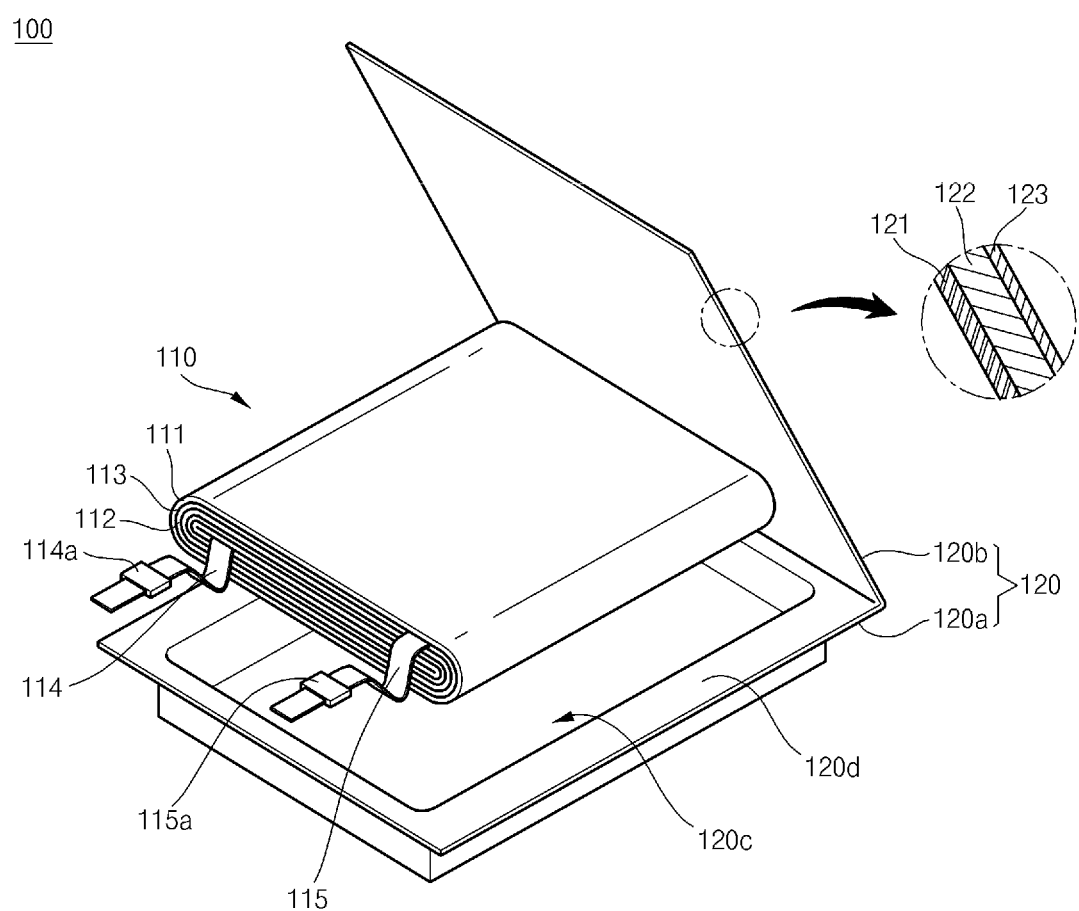
FIG. 1 is a perspective view illustrating a secondary battery according to an embodiment of the present disclosure.
Figure 2:
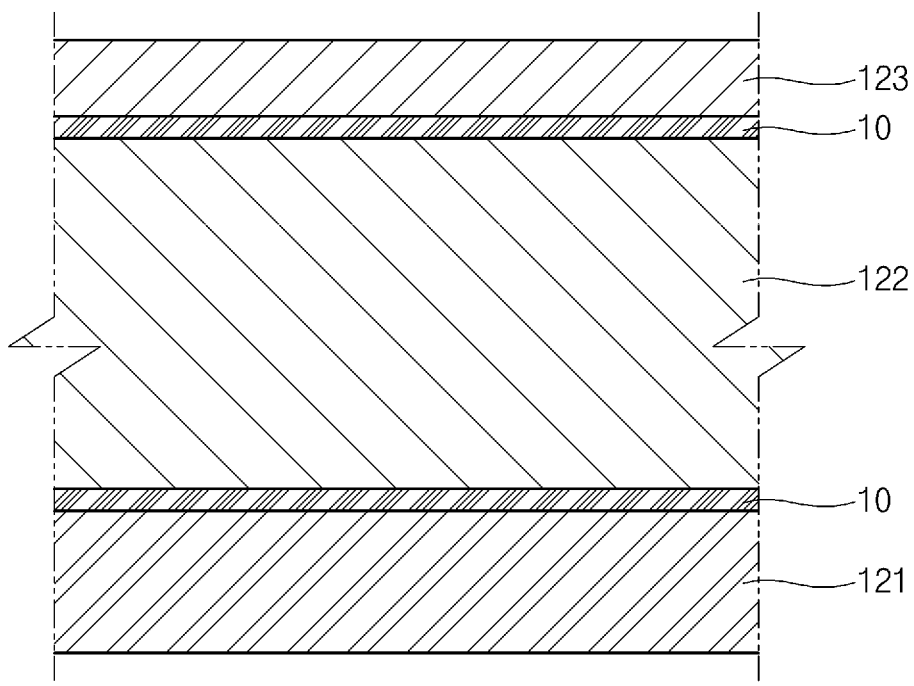
FIG. 2 is a cross-sectional view illustrating a sheath material in the secondary battery according to an embodiment of the present disclosure.

FIG. 1 is a perspective view illustrating a secondary battery according to an embodiment of the present disclosure. FIG. 2 is a cross-sectional view illustrating a sheath material in the secondary battery according to an embodiment of the present disclosure.

Referring to FIGS. 1 and 2, the secondary battery 100 according to an embodiment of the present disclosure includes an electrode assembly 110 and a sheath material 120.

The electrode assembly 110 may be formed by winding or laminating a stacked structure including a first electrode 111, a separator 113, and a second electrode 112, which are formed of thin plates or layers. Here, the first electrode 111 may serve as a positive electrode and the second electrode 112 may serve as a negative electrode. Of course, polarities of the first electrode 111 and the second electrode 112 may be reversed according to the option made by a person skilled in the art to then be arranged.

The first electrode 111 is formed by coating a first electrode active material, such as a transition metal oxide, on a first electrode current collector made of a metal foil including, for example, aluminum, and includes a first electrode uncoated portion, on which the first electrode active material is not coated. In addition, a first electrode tab 114 is attached to the first electrode uncoated portion. The first electrode tab 114 may be attached to the first electrode uncoated portion by, for example, welding. One end of the first electrode tab 114 is electrically connected to the first electrode 111, and the other end thereof is exposed and protruded from the sheath material 120.

The second electrode 112 is formed by coating a second electrode active material, such as graphite or carbon, on a second electrode current collector made of a metal foil including, for example, copper or nickel, and includes a second electrode uncoated portion, on which the second electrode active material is not coated. In addition, a second electrode tab 115 is attached to the second electrode uncoated portion. The second electrode tab 115 may be attached to the second electrode uncoated portion by, for example, welding. One end of the second electrode tab 115 is electrically connected to the second electrode 112, and the other end thereof is exposed and protruded from the sheath material 120.

Here, the first electrode tab 114 and the second electrode tab 115 are covered by insulation members 114a and 115a, respectively, thereby preventing the same from being electrically shorted to the sheath material 120.

The separator 113 positioned between the first electrode 111 and the second electrode 112 prevents an electric short between the first electrode 111 and the second electrode 112 and allows lithium ions to move. The separator 113 may include, but not limited to, one or more of polyethylene, polypropylene, and a composite film of polyethylene and polypropylene. However, the present disclosure does not limit the material of the separator 113 to those listed herein.

The sheath material 120 receives the electrode assembly 110 and is a pouch type sheathing including a first sheathing portion 120a and a second sheathing portion 120b combined with the first sheathing portion 120a. The first sheathing portion 120a and the second sheathing portion 120b have edge surfaces connected to each other at one side, and a recess 120c having a predetermined depth to receive the electrode assembly 110 is provided in the first sheathing portion 120a. Sealing portions 120d are located at edges of the first sheathing portion 120a and the second sheathing portion 120b to be sealed by, for example, thermal fusion. That is to say, the electrode assembly 110 is placed in the recess 120c of the first sheathing portion 120a, and the sealing portions 120d of the first sheathing portion 120a and the second sheathing portion 120b are thermally fused to allow the electrode assembly 110 to be received in the sheath material 120. In other words, the sheath material 120 is configured to have a first sheathing portion 120a and a second sheathing portion 120b, which are integrally formed by bending the center of one side of a laminate sheath material shaped of a rectangular plate in a lengthwise direction. The sealing portions 120d may be located along one side where the first sheathing portion 120a and the second sheathing portion 120b integrally adjoin each other, and the other three sides of each of first sheathing portion 120a and the second sheathing portion 120b. The sheath material 120 includes a couple of long sides facing the first sheathing portion 120a and the second sheathing portion 120b and a couple of short sides perpendicular to the couple of long sides and facing each other. Here, the first and second electrode tabs 114 and 115 of the electrode assembly 110 are drawn out through one of the couple short sides, where the first sheathing portion 120a and the second sheathing portion 120b are connected to each other, and the other of the couple of short sides, which faces the one short side. Here, the insulation members 114a and 115a located at the first and second electrode tabs 114 and 115 are sealed on the sealing portions 120d. In other words, the insulation members 114a and 115a are located on contact portions between the first and second electrode tabs 114 and 115 and the sealing portions 120d to prevent electrical shorts between the first and second electrode tabs 114 and 115 and the sheath material 120.

The sheath material 120 may have a multi-layered structure including a first insulation layer 121, a metal layer 122 and a second insulation layer 123.

The first insulation layer 121 defines an internal surface of the sheath material 120 and is made of an insulating and thermally adhesive material. In addition, the first insulation layer 121 is located on one surface of the metal layer 122 and defines the internal surface of the sheath material 120 facing the electrode assembly 110. The first insulation layer 121 may include, but not limited to, casted polypropylene (CPP), which does not react with an electrolyte, or an equivalent thereof. If the electrode assembly 110 is accommodated in the recess 120c of the first sheathing portion 120a and is then covered with the second sheathing portion 120b, the first insulation layers 121 of the first and second sheathing portions 120a and 120b of the sheath material 120 are brought into contact with each other. Therefore, if the sealing portions 120d are thermally fused, the first insulation layers 121 of the first and second sheathing portions 120a and 120b of the sheath material 120 are adhered to each other, thereby sealing the sheath material 120.

The metal layer 122 is positioned between the first insulation layer 121 and the second insulation layer 123, prevents external moisture and oxygen from penetrating into the sheath material 120, and prevents an electrolyte filled in the sheath material 120 from leaking to the outside. In addition, the metal layer 122 maintains mechanical strength of the sheath material 120 and transfers the heat generated in the electrode assembly 110 to the exterior. The metal layer 122 may be generally made of, but not limited to, aluminum, an aluminum alloy, iron, or an iron alloy.

The second insulation layer 123 defines an external surface of the sheath material 120 and serves to absorb mechanical and chemical shocks, e.g., from an external electric device. In addition, the second insulation layer 123 is located on the other surface of the metal layer 122 and defines the external surface of the sheath material 120. The second insulation layer 123 may be made of, but not limited to, nylon, polyethylene terephthalate (PET), polybutylene terephthalate (PBT), polybutylene naphthalate (PBN), or equivalents thereof.

Here, an adhesion member 10 may be located between the first insulation layer 121 and the metal layer 122 and between the metal layer 122 and the second insulation layer 123. That is to say, the first insulation layer 121 and the second insulation layer 123 may be attached to the metal layer 122 through the adhesion member 10. The adhesion member 10 may have a thickness of about 3 µm. Here, the first insulation layer 121, the second insulation layer 123 and the adhesion member 10 are collectively defined as a non-metal layer. That is to say, the sheath material 120 may include the metal layer 122 and the non-metal layer (121+123+10) located on the surface of the metal layer 122.

Since heat may be internally generated in the secondary battery 100 due to overcharging or short-circuit, a thermal cut-off device (TCO) may be attached to the first electrode tab 114 or the second electrode tab 115 to prevent explosion of the secondary battery 100 due to the internally generated heat. Here, if the thermal conductivity of the sheath material 120 is low, the secondary battery 100 may explode by the internally generated heat before the TCO is operated, resulting in a dangerous situation. Accordingly, in the present disclosure, in order to increase the thermal conductivity of the sheath material 120, the thickness of the metal layer 122 is increased, thereby improving the safety of the secondary battery 100 against overcharging.

Specifically, in the present disclosure, in order to increase the thermal conductivity of the sheath material 120 without increasing the total thickness of the sheath material 120, the thickness of the metal layer 122 may be increased, and the thickness(es) of the first insulation layer 121 and/or the second insulation layer 123 may be reduced. Here, the second insulation layer 123 defines the outer surface of the sheath material 120 and has influence on formability of the sheath material 120. Thus, while maintaining the thickness of the second insulation layer 123 almost as it is, the thickness of the first insulation layer 121 is reduced, and thus securing the thickness of the metal layer 122 as much as the reduced thickness of the first insulation layer 121.

Referring to FIG. 2, the total thickness of the sheath material 120 may range from about 80 µm to about 120 µm, and the total thickness of the sheath material 120 is preferably 88 µm.

In addition, the thickness of the first insulation layer 121 may occupy about 20% to about 30% of the total thickness of the sheath material 120. For example, the thickness of the first insulation layer 121 may be 20 µm. Since the first insulation layers 121 of the first sheathing portion 120a and the second sheathing portion 120b of the sheath material 120 are thermally fused to each other when sealing the first sheathing portion 120a and the second sheathing portion 120b, the first insulation layer 121 is related to an adhesion force of the sheath material 120. That is to say, if the thickness of the first insulation layer 121 is less than about 20% of the total thickness of the sheath material 120, the adhesion force between the first sheathing portion 120a and the second sheathing portion 120b may be lessened. If the thickness of the first insulation layer 121 is greater than about 30% of the total thickness of the sheath material 120, the thickness of the first insulation layer 121 may be excessively increased, decreasing the thickness of the metal layer 122 or the second insulation layer 123, thereby undesirably lowering the thermal conductivity and/or formability. Here, if the thickness of the metal layer 122 is reduced, the thermal conductivity of the sheath material 120 may be lowered, and if the thickness of the second insulation layer 123 is reduced, the formability of the sheath material 120 may be lowered. In addition, the thickness of the first insulation layer 121 may become smaller than that of the second insulation layer 123.

The thickness of the metal layer 122 may occupy 50% to 70% of the total thickness of the sheath material 120. The metal layer 122 may have a thickness of, for example, 50 µm. The metal layer 122 may serve to maintain the mechanical strength of the sheath material 120 and may increase the thermal conductivity. If the thickness of he metal layer 122 is less than 50% of the total thickness of the sheath material 120, the thermal conductivity of the sheath material 120 may be lowered, and the secondary battery 100 may explode before the TCO is operated, thereby deteriorating the safety. In addition, the mechanical strength of the sheath material 120 may be lessened, and deformation may occur to the secondary battery 100 in an event of falling or applying external shocks thereto. In addition, if the thickness of the metal layer 122 is greater than 70% of the total thickness of the sheath material 120, the thicknesses of the first insulation layer 121 and the second insulation layer 123 may be reduced, lowering adhesion force and/or formability. Here, if the thickness of the first insulation layer 121 is reduced, the adhesion force of the sheath material 120 is lowered, and if the thickness of the second insulation layer 123 is reduced, the formability of the sheath material 120 is lowered.

In addition, the thickness of the metal layer 122 may be 1.04 to 1.86 times that of the non-metal layer. Here, if the thickness of the metal layer 122 is less than 1.04 times that of a sum of the thicknesses of the respective components of the non-metal layer, including the first insulation layer 121, the second insulation layer 123 and the adhesion member 10, the thermal conductivity of the sheath material 120 is lowered, the secondary battery 100 may be at the risk of explosion before the TCO is operated, lowering the safety. In addition, the mechanical strength of the sheath material 120 is lessened, and the secondary battery 100 may be deformed in an event of falling or applying external shocks thereto. In addition, if the thickness of the metal layer 122 is greater than 1.86 times that of the non-metal layer, the thicknesses of the first insulation layer 121 and the second insulation layer 123 may be reduced, lowering the adhesion force and/or formability.

The thickness of the second insulation layer 123 may occupy 13% to 20% of the total thickness of the sheath material 120. For example, the second insulation layer 123 may have a thickness of 12 µm. Here, if the thickness of the second insulation layer 123 is less than about 13% of the total thickness of the sheath material 120, the formability of the sheath material 120 may be deteriorated, and wrinkles or cracks may be created during formation of the recess 120c in the sheath material 120. In addition, if the thickness of the second insulation layer 123 is greater than about 20% of the total thickness of the sheath material 120, the thickness of the second insulation layer 123 may be excessively increased, decreasing the thicknesses of the first insulation layer 121 and the metal layer 122, thereby undesirably lowering the thermal conductivity and/or formability.

In addition, the thickness of the secondary battery 100 according to an embodiment of the present disclosure, that is, the thickness ranging from the second sheathing portion 120b to the first sheathing portion 120a having the recess 120c located therein, may range from 2.5 mm to 6 mm. Here, if the thickness of the secondary battery 100 is less than 2.5 mm, the electrode assembly 110 received in the recess 120c may have an insufficient capacity, and if the thickness of the secondary battery 100 is greater than 6 mm, the secondary battery 100 may become bulky, making it impossible to make the secondary battery 100 compact and lightweight.

To inspect thermal conductivity performance of the secondary battery of the present disclosure, the following experiments were conducted.

A plurality of secondary batteries each including an electrode assembly and a sheath material receiving the electrode assembly, were prepared. Here, the plurality of secondary batteries having the same capacity of 3.9 Ah were used, and metal layers thereof were set to occupy the sheath material in different proportions. In addition, a thermal cut-off device (TCO) was attached to an electrode tab of each of the secondary batteries. The secondary batteries were artificially made to generate heat (to be overcharged) and temperatures thereof were then measured to check whether the TCO was operated. This procedure was repeated 10 times.

The experimental results are summarized in Table 1 below.

TABLE 1

| Thickness of metal layer (μm) | Thickness proportion of metal layer/ sheath material | Thickness proportion of metal layer/ non-metal layer | Battery temperature difference (° C.) | Thermal conductivity (W/mk) | TCO operation |
|---|---|---|---|---|---|
| 35 | 0.40 | 0.67 | 24.3 | 96 | NG |
| 40 | 0.46 | 0.85 | 21.1 | 110 | OK |
| 45 | 0.50 | 1.04 | 18.2 | 120 | OK |
| 50 | 0.60 | 1.50 | 16.1 | 134 | OK |
| 55 | 0.65 | 1.86 | 14.9 | 143 | OK |

As can be seen from Table 1, as the thickness of a metal layer is increased, the battery temperature differences is reduced and the thermal conductivity of the sheath material is improved. In addition, although the thickness of the metal layer may be increased up to 55 μm or greater, the increased thickness proportion of the metal layer may lower the adhesion force and/or formability of the sheath material. Therefore, the thickness of the metal layer is preferably set to be less than 70% of the total thickness of the sheath material. In addition, when the thickness of the metal layer is less than 40% of the total thickness of the sheath material, the battery temperature difference is increased, and the thermal conductivity of the sheath material is relatively low, so that the TCO may not be properly operated. Therefore, in order to allow the TCO to be properly operated, the thickness of the metal layer needs to be greater than 40%, preferably greater than 50, of the total thickness of the sheath material.

As described above, the secondary battery 100 according to an embodiment of the present disclosure may increase the thermal conductivity of the sheath material 120 by increasing the thickness of the metal layer 122 provided in the sheath material 120 without increasing the total thickness of the sheath material 120, thereby improving the safety of the secondary battery 100.

While the foregoing embodiment has been described to practice the secondary battery of the present disclosure, it will be understood by those of ordinary skill in the art that various changes in form and details may be made therein without departing from the spirit and scope of the present invention as defined by the following claims.

The invention claimed is:

1. A secondary battery comprising:
an electrode assembly; and
a sheath material which receives the electrode assembly and comprises a metal layer and a non-metal layer formed on a surface of the metal layer,
wherein the non-metal layer comprises polybutylene terephthalate (PBT), or polybutylene naphthalate (PBN),
wherein the non-metal layer comprises:
a first insulation layer located on one surface of the metal layer and defining an internal surface of the sheath material; and
a second insulation layer located on another surface of the metal layer facing away from the one surface of the metal layer, the other surface defining an external surface of the sheath material,
wherein the total thickness of the sheath material ranges from 80 μm to 88 μm,
wherein the metal layer comprises an aluminum alloy or consists of iron,
wherein the thickness of the metal layer occupies 50% to 70% of the total thickness of the sheath material,
wherein the thickness of the metal layer is 1.04 to 1.50 times that of the non-metal layer,
wherein the thickness of the first insulation layer occupies 20% to 30% of the total thickness of the sheath material and the thickness of the second insulation layer occupies 13% to 20% of the total thickness of the sheath material, and
wherein the thermal conductivity of the sheath material ranges from 120 to 150 W/mk.

2. The secondary battery of claim 1, wherein the non-metal layer further comprises:
an adhesion member located between the first insulation layer and the metal layer and between the second insulation layer and the metal layer.

3. The secondary battery of claim 1, wherein the thickness of the secondary battery ranges from 2.5 mm to 6 mm.

4. The secondary battery of claim 2, wherein the first insulation layer comprises casted polypropylene (CPP), and the second insulation layer comprises polybutylene terephthalate (PBT), or polybutylene naphthalate (PBN).

* * * * *